United States Patent [19]

Takayama

[11] Patent Number: 5,151,729
[45] Date of Patent: Sep. 29, 1992

[54] ZOOM LENS BARREL
[75] Inventor: Toru Takayama, Kawasaki, Japan
[73] Assignee: Nikon Corporation, Tokyo, Japan
[21] Appl. No.: 681,780
[22] Filed: Apr. 8, 1991
[30] Foreign Application Priority Data Apr. 10, 1990 [JP] Japan ............................... 2-37711[U]

[51] Int. Cl.⁵ .............................................. G03B 1/18
[52] U.S. Cl. .................. 354/195.12; 359/701
[58] Field of Search .......................... 354/195.12, 400;
359/676, 694, 699, 700, 701, 702

[56] References Cited
U.S. PATENT DOCUMENTS 4,848,884 7/1989 Enomoto ......................... 354/400 X Primary Examiner—L. T. Hix
Assistant Examiner—David M. Gray
Attorney, Agent, or Firm—Shapiro and Shapiro

[57] ABSTRACT

A zoom lens barrel comprises a plurality of lens groups; a fixed barrel having integrally and securely a mount portion for mounting the zoom lens barrel on the camera body; a zoom operation ring which is moved along an optical axis relative to the fixed barrel and causes lens groups associated with zooming to shift along the optical axis so as to execute a zooming action; a focus operation ring which is rotatably supported by the zoom operation ring and is moved with the zoom operation ring along the optical axis, and causes lens groups associated with focusing to shift along the optical axis through its own rotation so as to execute a focus action; and a cam ring which during the focus action cooperates with the focus operation ring and is moved along the optical axis relative to the fixed barrel to thereby shift lens groups associated with the focusing along the optical axis, and during the zooming action interlocks with the zoom operation ring to rotate to thereby shift the lens groups associated with the zooming along the optical axis. A first closest photographing distance limit mechanism acts between the focus operation ring and zoom operation ring. A second closest photographing distance limit mechanism acts between the fixed barrel and the cam ring. Within a specified focal length range the rotation of the focus operation ring is restrained by the second limit mechanism while in the focal length range other than the specified range the rotation of the focus operation ring is restricted by the first limit mechanism, thereby ensuring the optimum restriction of the closest photographing distance at any focal lengths.

1 Claim, 3 Drawing Sheets

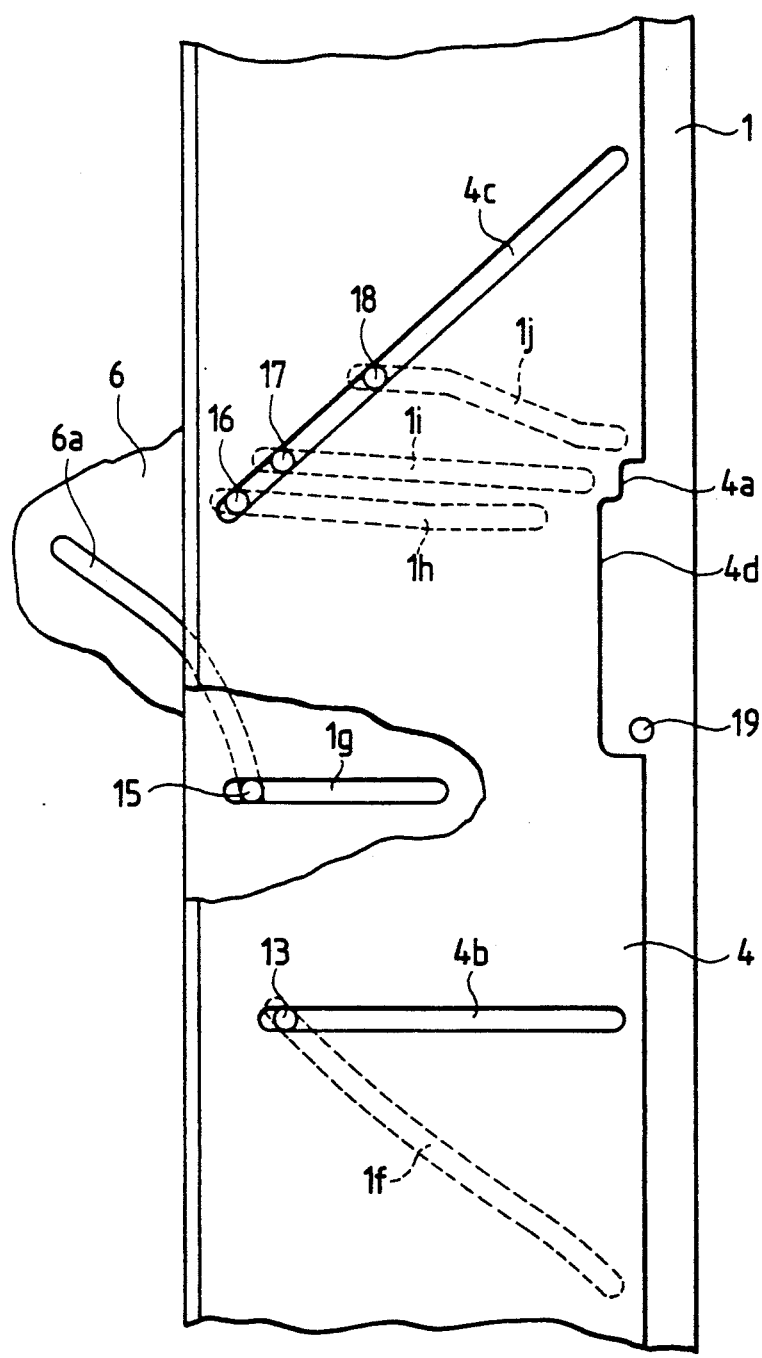

ZOOM LENS BARREL

BACKGROUND OF THE INVENTION

1. Field of the Invention

The present invention relates to a zoom lens barrel, and more specifically, is directed to a rear focusing zoom lens barrel for use in 35 mm single-lens reflex cameras.

2. Related Background Art

As a focusing system for a zoom lens, known is a front group shift focusing, a rear group shift focusing, and other focusing systems.

In the zoom lens having a wider range of object angle, a first lens group which is located at the position nearest to the object has generally a larger lens diameter. Consequently, the front group shift focusing system in which the first lens group is shifted is liable to suffer a substantially heavy load. Accordingly at an electric automatic so-called AF focusing, the focusing speed is decelerated.

On the contrary, the rear group shift focusing system in which a rear group lens facing the mount side is shifted toward the film surface, that is, so-called rear focusing system is less loaded when shifting the lens groups. As a result, at AF focusing, a relatively prompt focusing speed can be obtained as compared to the front group shift focusing system.

A great variety of techniques with regard to the lens configuration in which the rear focusing system is employed for the zoom lens are known. Above all, Japanese Patent application Laid-Open No. 60-43619 discloses a structure in which a shift of lens group during the focusing action and a shift during the zooming action are performed by the same member.

In the conventional rear focus zoom lens, when the focusing operation is executed from the farthest side to the nearest side, the rear lens group is backwardly moved toward the camera body side. At this time, if the shift distance is too large, the lens collides with a jump-up mirror provided inside the camera body. Therefore, a shift limit is provided so as to avoid a collision to prevent a further retreat of the rear lens group. This often prevents the rear lens group from shifting up to the closest distance at which the performance on the optical design is ensured. When the shift limit for avoiding a collision arising from retreat of the rear group lens is uniformly located over the entire focal length range of the zooming field, the shift limit must be positioned corresponding to a narrower focal length range of the zooming field. In consequence, even in the other field in which there is no risk that the rear lens group collides with the jump-up mirror, since they are remote enough from each other as compared with the case with the aforementioned focal length range, the closest photographing length is needlessly restricted in the same manner.

Due to this, across the overall focal length range of the zooming field, the performance on the optical design can not satisfactorily be exhibited.

SUMMARY OF THE INVENTION

In view of the above problems, it is an object of the present invention to secure a closest photographing distance within a broader focal length range of a zooming field and enable a satisfactory exhibition of the performance on the optical design.

In order to overcome the above disadvantages, the present invention provides a zoom lens barrel comprising:

a plurality of lens groups LI, LII, LIII, LIV, and LV;

a fixed barrel 1 having integrally and securely a mount portion for mounting said zoom lens barrel on the camera body;

a zoom operation ring 2 which is moved along an optical axis relative to said fixed barrel 1 and causes lens groups LI, LII, LIII, LIV, and LV associated with zooming to shift along the optical axis so as to execute a zooming action;

a focus operation ring 11 which is rotatably supported by said zoom operation ring 2 and is moved with said zoom operation ring 2 along the optical axis, and causes lens groups LIII, LIV, and LV associated with focusing to shift along the optical axis through the rotation so as to execute a focusing action;

a cam ring 4 which, during the focusing action cooperates with said focus operation ring 11 and is moved along the optical axis relative to said fixed barrel 1 to thereby shift lens groups LIII, LIV, and LV associated with the focusing along the optical axis, and during the zooming action interlocks with said zoom operation ring 2 to rotate to thereby shift the lens groups LI, LII, LIII, LIV, and LV associated with the zooming along the optical axis;

a first nearest photographing distance limit mechanism 11c and 2d provided between said focus operation ring 11 and said zoom operation ring 2, the mechanism restraining a rotation of said focus operation ring 11 during the focusing action so as to restrict a backward shift of said cam ring 4 thereby restricting a backward shift of the lens groups LIII, LIV, and LV associated with the focusing; and a second nearest photographing distance limit mechanism 19 and 4a including a limit member 19 provided on said fixed barrel 1 and an abutment surface 4a adapted to abut with said limit member 19, provided on said cam ring 4, the mechanism restraining a rotation of said focus operation ring 11 through an abutment of said limit member 19 with said abutment surface 4a during the focusing action, thereby restricting a backward shift of said cam ring 4 to consequently restrict a backward shift of said lens groups LIII, LIV, and LV associated with the focusing;

wherein within a specified focal length range the rotation of said focus operation ring 11 is restrained by said second limit mechanism 19, 4a before said first limit mechanism 11c, 2d acts, and in a focal length range other than said specified range the rotation of said focus operation ring 11 is restricted by said first limit mechanism 11c, 2d.

Within a part of the focal length range of the zooming field, a limit pin 19 provided on the fixed barrel 1 and an abutment surface 4a provided on the cam ring 4, which constitute a second limit mechanism in cooperation, abut each other before a first limit mechanism, which is constituted of a limit projection 11c on the focus operation ring 2 and a circumferential groove 2d, operates.

The cam ring 4 is moved along the optical axis relative to the fixed barrel 1 during the focusing action thereby shifting the rear lens group LIII, LIV, and LV associated with the focusing. At this time, the second limit mechanism composed of a limit pin 19 and the abutment surface 4a acts to restrain the retreat so as to limit the closest photographing distance.

In the other focal length range of the zooming field, the limit projection 11c on the focus operation ring 11 and the groove 2d of the zoom operation ring 2, which constitute the first limit mechanism, abut each other.

The relief surface 4d of the cam ring 4 is provided ahead of the abutment surface 4a, and the cam ring 4 is allowed to move backward without being restricted by means of the limit pin 19 at the relief surface 4d, thereby shifting the rear group lens LIII, LIV, LV backwardly along the optical axis. As a result, the rear lens group can be retreated across the overall range where the performance on the optical design is ensured.

The reference numerals marked in the above description are used only for clarification, which does not limit the scope of the present invention.

BRIEF DESCRIPTION OF THE DRAWINGS

FIGS. 2 and 3 are developments of the cam portion of the embodiment showing a wide angle mode and telephoto mode, respectively.

DETAILED DESCRIPTION OF THE PREFERRED EMBODIMENTS

An embodiment of the present invention will be now be described with reference to FIG. 1.

Figure 1:
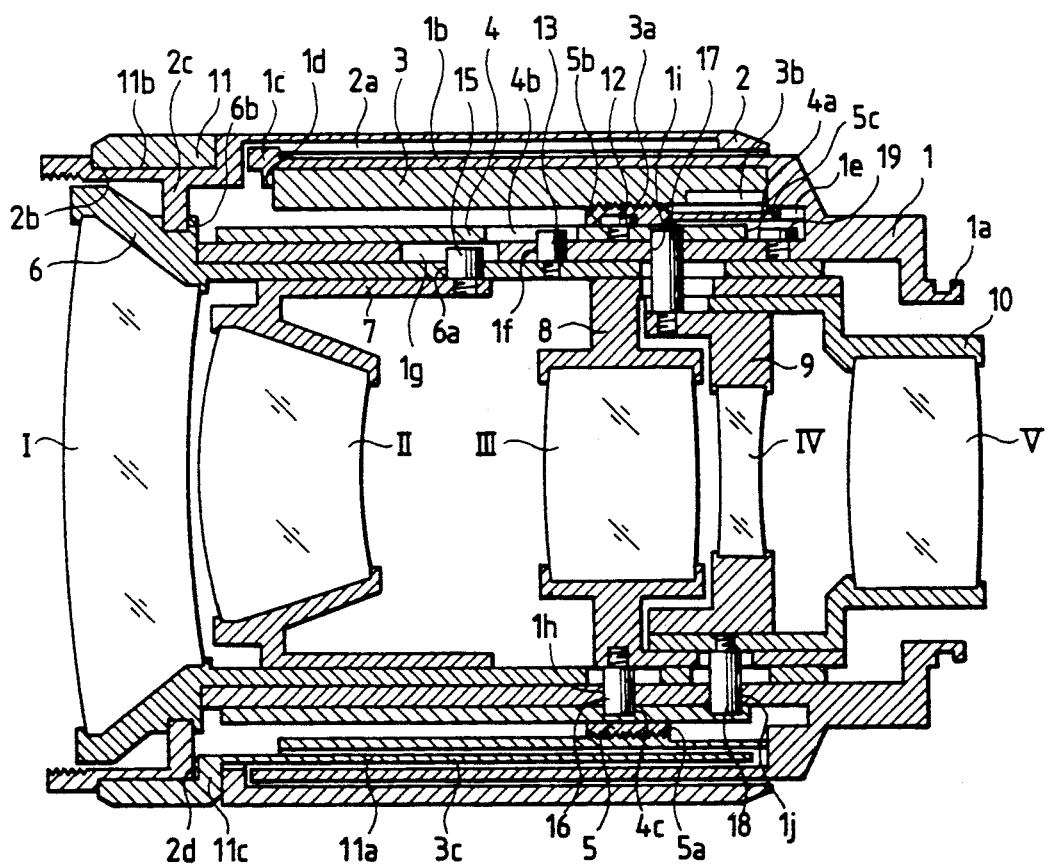
FIG. 1 is a sectional view of a zoom lens barrel of an embodiment in accordance with the present invention.

FIG. 1 is a sectional view of a zoom lens barrel embodying the present invention.

A fixed barrel 1 has, at its body (not shown), an integrally formed mount portion 1a for mounting on the camera body.

Into the inner periphery of the fixed barrel 1, there is fitted a first slide ring 6 which retains a first lens group L1 inside at its front end, or at its end closest to an object.

A cam pin 13 is planted in the first slide ring 6, which extends through a cam groove 1f of the fixed barrel 1 into a linear groove 4b of a cam ring 4.

A second slide ring 7 for retaining a second lens group LII inside and a third slide ring 8 for retaining a third lens group LIII at its internal side of the front end, are each fitted into the inner periphery of the first slide ring 6.

A cam pin 15 is planted in the second slide ring 7, which extends through a cam groove 6a of the first slide ring 6 into a linear guide groove 1g of the fixed barrel 1.

A cam pin 16 is planted in the third slide ring 8, which extends through a guide groove 1h of the fixed barrel 1 into a lead groove 4c of the cam ring 4.

Into the inner periphery of the third slide ring 8, there is fitted a fifth slide ring 10 which retains a fifth lens group LV at its internal side of the rear end.

A cam pin 18 is planted in the fifth slide ring 10, which extends through a guide groove 1j of the fixed barrel 1 into the lead groove 4c of the cam ring 4.

Into the inner periphery of the fifth slide ring 10, there is fitted a fourth slide ring 9 which retains a fourth lens group LIV at its internal side.

A cam in 17 is planted in the fourth slide ring 9, which extends through a guide groove 1i of the fixed barrel 1 into a lead groove 4c of the cam ring 4.

The cam ring 4 is fitted on the outer periphery of the fixed barrel 1.

In the inner periphery of an annular extension 1b which is radially outwardly forward diverging from the main part of the fixed barrel 1, there is fitted a segment gear ring 3 rotatable around the optical axis but with the prohibition of any shift along the optical axis by means of a shift limit member 1d provided at the tip of the annular extension 1b.

The segment gear ring 3 has, at its rear end inner periphery, a gear 3b which is engaged with a final reduction gear (not shown) of the power transmission shaft which is rotated by the driving force derived from the camera body side (not shown).

Further, the segment gear ring 3 has, at its inner periphery, a helicoid screw 3a which is interlocked with a helicoid screw 5a provided at the outer periphery of a focus lead ring 5.

The focus lead ring 5 has a backwardly projecting key 5c which is inserted in a key seat 1e of the fixed barrel 1. Also, on the inner periphery of the focus lead ring 5, there is provided a circumferential groove 5b which receives a pin 12 planted in the cam ring 4.

A zooming operation ring 2 situated around the annular extension has at its inner periphery a linear guide groove 2a extending along the optical axis. The guide groove 2a receives a key 1c provided at the front end of the annular extension 1b, thereby restraining the zoom operation ring 2 from rotating about the optical axis.

The zooming operation ring 2 further has at its forward inner periphery a radially inwardly extending projection 2c which is fitted in the circumferential groove 6b provided on the forward outer periphery of the first slide ring 6, thus allowing the first slide ring 6 to be rotated about the optical axis.

In the forward outer periphery of the zooming operation ring 2, there is fitted a focusing operation ring 11 rotatable about the optical axis.

The focusing operation ring 11 has, at its internal side, a radially inwardly extending limit projection 11c which has at its end a backwardly extending focus interlocking key 11a.

The limit projection 11c is inserted in the circumferential groove 2d provided on the zooming operation ring 2, so that the rotation of the focusing operation ring 11 about the optical axis is restricted by the circumferential groove 2d.

As the focus interlocking key 11a is fitted in the key seat 3c provided on the outer periphery of the segment gear ring 3, the segment gear ring 3 is rotated along with the focusing operation ring 11.

On the outer surface of the fixed barrel 1, there is screwed a limit pin 19 at the back of the rear end of the cam ring 4, whereby when the cam ring 4 is moved along the optical axis backwardly or toward the camera body side within the predetermined limits of the rotational angular position, the abutment surface 4a is abutted with the foregoing limit pin 19, thus preventing a further shift.

Figure 2:
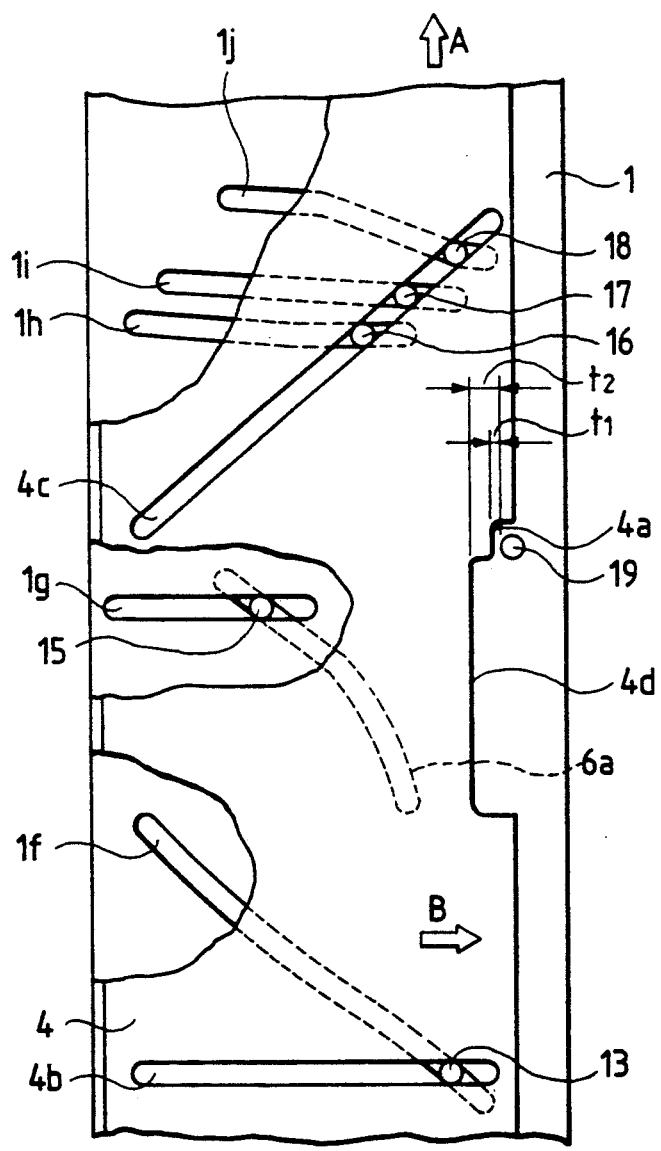

FIGS. 2 and 3 are developments showing a cam part at the farthest focus position when zooming is set in a wide-angle and a telephoto mode respectively.

In these developments, from the outside (side closer to a viewer in the direction perpendicular to the paper) to the inside, the cam ring 4, fixed barrel 1, and first slide ring 6 are laid in the above-mentioned order.

The linear groove 4b and lead groove 4c are formed on the cam ring 4 on the end surface of which the abutment surface 4a and the relief surface 4d are provided.

The cam groove 1f, linear guide groove 1g, guide groove 1h, guide groove 1i and the guide groove 1j are each provided on the fixed barrel 1.

The cam groove 6a is grooved in the first slide ring 6.

Cam pins (13, 15, 16, 17, 18) are received in their respective grooves.

The limit pin 19 is planted in the fixed barrel 1.

When the distance between the abutment surface 4a and the limit pin 19 is t1, the distance between the relief surface 4d and the limit pin 19 is t2, and in the focusing operations except the wide angle mode, the shift distance of the cam ring along the optical direction from the farthest photographing position to the nearest photographing position is L, the interrelation of the three elements is represented by t1<L<t2.

The operations of the present embodiment will next be described.

First of all, the zooming will be described.

During the zooming operation, the zooming operation ring 2 is moved forward (to the left side in the drawing) from the position in the wide angle mode as shown in FIG. 1 so as to reach the position in the telephoto mode. At this time, the zooming operation ring 2 is caused to move linearly by means of the key seat 2a thereof and the associated key which restrain the ring 2 from rotating about the optical axis.

Then the engagement of the projection 2c and the circumferential groove 6b causes the first slide ring 6 to be moved forward along the optical axis in cooperation with the ring 2. The foregoing engagement also allows a rotation around the optical axis and the cam pin 13 planted in the first slide ring 6 is fitted in the cam groove 1f of the fixed barrel 1, thereby enabling the first slide ring 6 to be rotated.

By virtue of thus obtained rotation, the cam pin 15 which is fitted in the cam groove 6a provided on the first slide ring 6 is guided through the linear guide groove 1g of the fixed barrel 1 and the second slide ring 7 is linearly moved forward along the optical axis.

Further, the shift and the rotation of the first slide ring 6 causes the cam ring 4 to be rotated in the direction designated by arrow A in FIG. 2. The cam pins 16, 17 and 18 are received in the lead groove 4c provided on the foregoing cam ring 4 so as to be guided by the guide grooves 1h, 1i and 1j of the fixed groove 1, respectively, and the third slide ring 8, the fourth slide ring 9 and the fifth slide ring 10 are each allowed to shift forwardly just a predetermined distance while rotating around the optical axis. Through the actions described above, the first to fifth lens groups (LI to LV) are shifted forward to obtain a telephoto mode.

When shifting from the position in the telephoto mode to the position in the wide angle mode, the action is performed in a manner reverse to the above action.

The focusing action will next be described.

At a manual focusing operation, a focus operation ring 11 is caused to rotate around the optical axis by hand to execute focusing. When shifting from the infinite side to the closest side, the rotation of the focus ring 11 causes the segment gear ring 3 to be rotated in a body around the optical axis owing to the engagement of its key 11a and the key seat 3c.

Due to this rotation, the focus lead ring 5 is moved linearly backwardly along the optical axis owing to the interlock of the helicoid screws 3a and 5a, and the engagement of the linear key 5c with the key seat 1e. In the circumferential groove 5b provided on the inner periphery of the focus lead ring 5, there is fitted a pin 12 planted in the cam ring 4, thereby linearly moving the cam ring 4 together in the direction designated by arrow B in the FIG. 2. The interlock of the lead groove 4c of the cam ring 4, the guide grooves 1h, 1i and 1j and the cam pins 16, 17 and 18 causes the third slide ring 8, the fourth slide ring 9, and the fifth slide ring 10 to be moved backwardly each just a predetermined distance while rotating.

By virtue of these actions, the third to fifth lens groups (LIII to LV) are moved backwardly or toward the closest photographing position.

At an automatic focusing operation, so-called AF operation, the rearmost gear (not shown) of the row of gears interlinked with the power transmission shaft driven from the camera body side is engaged with the gear 3b, to consequently enable the segment gear ring 3 to be rotated around the optical axis. After that, the operation thereof is performed in the same manner as the manual focusing operation.

When moved from the nearest side to the farthest side, the direction of the shift and the rotation is opposite to that in the above-described action.

As described above, in the wide angle mode or a shorter focal length range as shown in FIG. 2, a cam ring 4 is shifted corresponding to the focusing operation by t1 toward the direction B, while the abutment surface 4a provided on the cam ring 4 is abutted with the limit pin 19 provided on the fixed barrel 1 before other closest limit mechanism located between the limit projection 11c of the focus operation ring 11 and the circumferential groove 2d acts, so as to stop the cam ring 4.

In consequence, the rear lens groups (LIII, LIV, LV) are restrained from shifting backward, resulting in the restriction of the closest photographing distance.

Next, in the telephoto mode or a longer focal length range as shown in FIG. 3, when the cam ring 4 is backwardly moved corresponding to the focusing operation, the relief surface 4d approaches the limit pin 19, but is not abutted with it because the distance t2 between the two is kept larger than the shift distance up to the closest. In other words, in the focusing operations except the wide angle mode as described above, when the shift distance of the cam ring along the optical axis from the farthest photographing position to the closest photographing position is L, the interrelation of the three is represented by t1<L<t2, with the result that the closest limit mechanism between the limit projection 11c and the groove 2d is actuated to stop the cam ring 4.

Accordingly, the backward shift of the rear lens groups (LIII, LIV, LV) is not restrained, and hence the closest photographing distance is not restricted either.

Here, the action in the telephoto side shown in FIG. 3 is described by way of example. However, as can be seen from FIGS. 2 and 3, the abutment surface 4a functions only in the wide angle side, so that in the range except the wide angle mode, the nearest photographing distance is not restricted in the same way as the telephoto mode.

In the present embodiment, when the focusing operation from the farthest side to the nearest distance side is executed, the closest photographing distance at which the performance is ensured in view of the optical design is restricted in only the wide angle mode which is merely a little part of the focal length range in the zooming field. When the focusing operation from the farthest side to the nearest side in the other broader focal length range in the zooming field is executed, the effective closest photographing distance at which the performance is ensured in view of the optical design is not limited, thus obtaining a sufficient nearest distance.

Further, in the overall focal length range of the zooming field, even though the rear lens groups (LIII, ILV, IV) are backwardly moved toward the camera body side, they are not allowed to collide with a jump-up mirror provided in the camera body.

The present invention can be carried out at relatively low cost by merely providing a notch on the cam ring 4 and applying the limit pin 19.

What is claimed is:

1. A zoom lens barrel comprising:

a plurality of lens groups;

a fixed barrel having integrally and securely a mount portion for mounting said zoom lens barrel on a camera body;

a zoom operation ring which is moved along an optical axis relative to said fixed barrel and causes lens groups associated with zooming to shift along the optical axis so as to execute a zooming action;

a focus operation ring which is rotatably supported by said zoom operation ring and is moved with said zoom operation ring along the optical axis, and causes lens groups associated with focusing to shift along the optical axis through its own rotation so as to execute a focusing action;

a cam ring which, during the focus action cooperates with said focus operation ring and is moved along the optical axis relative to said fixed barrel to thereby shift lens groups associated with the focusing along the optical axis, and during the zooming action interlocks with said zoom operation ring to rotate to thereby shift the lens groups associated with the zooming along the optical axis;

a first nearest photographing distance limit mechanism provided between said focus operation ring and said zoom operation ring, the mechanism restraining rotation of said focus operation ring during the focus action so as to restrict a backward shift of said cam ring, thereby restricting a backward shift of the lens groups associated with the focusing; and a second nearest photographing distance limit mechanism including a limit member provided on said fixed barrel and an abutment surface, adapted to abut with said limit member, provided on said cam ring, the mechanism restraining a backward shift of said cam ring through an abutment of said limit member with said abutment surface during the focusing action, thereby restricting a backward shift of the lens groups associated with the focusing;

wherein within a specified focal length range the rotation of said focus operation ring is restrained by said second limit mechanism before said first limit mechanism acts, and in a focal length range other than said specified range the rotation of said focus operation ring is restricted by said first limit mechanism.

* * * * *